S. H. COX.
CENTERING AND DRIVING MEANS FOR TOOLS.
APPLICATION FILED JULY 28, 1910.
976,346. Patented Nov. 22, 1910.
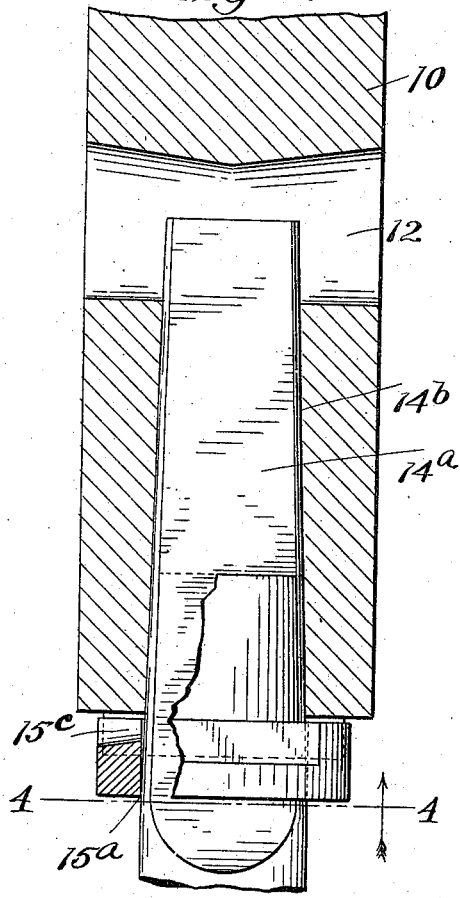
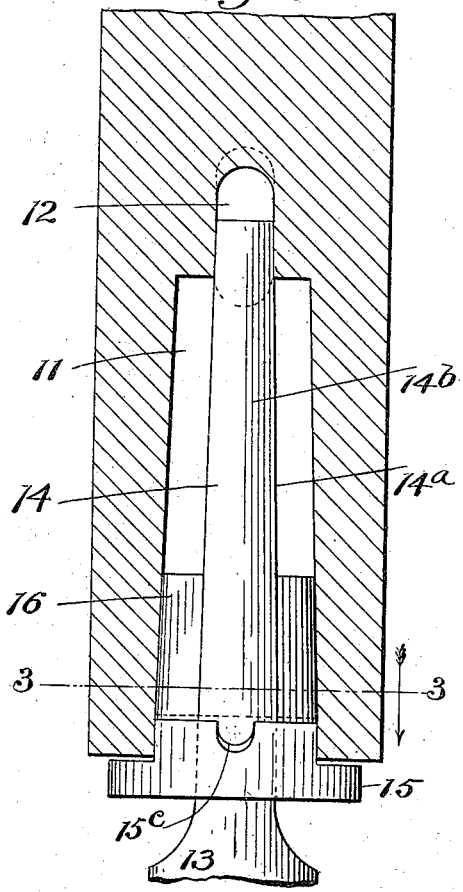
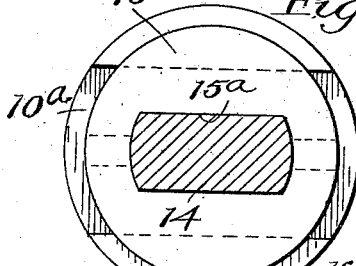
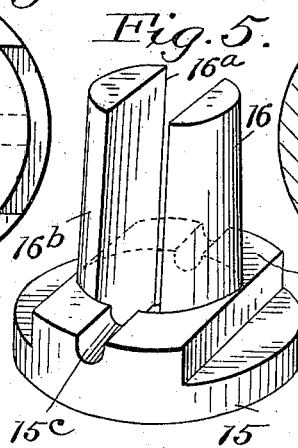
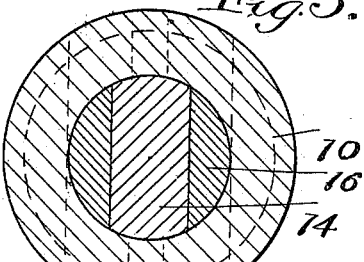
Witnesses:
E. B. Gilchrist,
H. R. Sullivan.
Inventor.
Samuel H. Cox
by Thurston & Kwis
Attys.

UNITED STATES PATENT OFFICE.

SAMUEL H. COX, OF CLEVELAND, OHIO, ASSIGNOR TO THE CLEVELAND TWIST DRILL COMPANY, OF CLEVELAND, OHIO, A CORPORATION OF OHIO.

CENTERING AND DRIVING MEANS FOR TOOLS.

976,346.  Specification of Letters Patent.  Patented Nov. 22, 1910.

Application filed July 28, 1910. Serial No. 574,283.

*To all whom it may concern:*

Be it known that I, SAMUEL H. Cox, a citizen of the United States, residing at Cleveland, in the county of Cuyahoga and State of Ohio, have invented a certain new and useful Improvement in Centering and Driving Means for Tools, of which the following is a full, clear, and exact description.

This invention relates to means for centering a tool in a driving spindle and for forming a driving connection between the spindle and tool, being especially adapted for use in connection with tools known as high speed tools or such as are formed from expensive material.

The ordinary or commercial twist drill is usually cut or milled from a solid bar and is provided with a cone shaped shank adapted to fit a cone shaped spindle opening and at the end of the shank is provided with a tang which is adapted to engage within a suitable opening at the inner or small end of the cone shaped opening whereby the driving connection is formed between the tool and spindle. In forming tools in this manner so much material is wasted that high speed drills which are generally formed from high priced steel are frequently made by forging or twisting approximately rectangular bars, the shank of the drill being often formed with opposite flat tapered sides and with rounded tapered edges. The smaller sizes of high speed drills formed in this manner are generally centered and held in the spindle openings by means of sockets or bushings quite similar in external shape to the shank of an ordinary commercial drill, this socket having an opening shaped to fit the shank of the drill and being conical or tapered on the exterior to fit the spindle opening and also having at its inner or small end a tang-like extension which engages in the narrow opening at the inner or small end of the cone shaped spindle opening so as to form the driving connection between the spindle and the socket and drill. This means for centering the drill and for forming the driving connection between the drill and spindle is unsuitable for larger sizes of drills, say from two to three inches in diameter, for the reason that the shank of such a drill if made of the proper size to withstand torsional stresses is too large to permit the use of the cone shaped socket or bushing between the shank and spindle, especially as few machines have a spindle opening larger than what is known as No. 5 standard taper. Therefore some means for centering or centering and driving large drills other than the above mentioned sockets or bushings employed with the smaller sizes, becomes necessary.

I make the shank on the larger drills similar in shape to the shanks of the smaller drills,—that is, with two opposite flat sides and with rounded tapered edges, but for the larger drills, the edges are turned to the exact standard taper of the machine spindle, the thickness at the smaller end being the same as the thickness of the tang on a milled drill. It is obvious that when the shank is so formed it will fit the corresponding standard tapered spindle opening and that the driving connection will be provided the same as with the smaller high speed drills or with the milled drills, but at the base or large end of the spindle opening there will be an open space on each side of the flat shank.

One of the objects of the invention is to provide a means for filling these open spaces and to effectively center the flat shank and prevent it from moving laterally in the spindle opening and from battering or injuring its inner wall.

A further object which is attained in the preferred form of my invention, is to provide a powerful auxiliary driving device to supplement the driving which is obtained at the inner end of the shank by reason of the driving connection between this end and the slot in the spindle in which it engages.

In carrying out my invention, I provide a device which is employed at the end of the spindle and which when utilized in connection with drills having shanks formed in the manner above stated, that is with opposite flat sides and with edges rounded and tapered to fit the spindle opening, is in the form of a collar having an opening through which the shank extends and which is shaped substantially to fit the shank, and having also a pair of lugs which extend inwardly between the shank and the spindle, to fill the openings, previously referred to, between the flat sides of the shank and the inner rounded wall of the spindle opening, said lugs having inner flat faces which are engaged by the opposite flat sides of the shank and having outer surfaces rounded and tapered to fit the conical wall of the spindle opening. This device holds and centers the shank in a very effective manner. In the preferred form of my invention, this device is utilized also as an auxiliary driving means between the tool and spindle and for this purpose the collar and spindle are provided with interlocking parts which may be formed by providing a mortise slot at the end of the spindle and by milling off portions of the collar, leaving projections which engage in the mortise slot. With this arrangement, the shank is driven both at its inner end and at its outer end, and consequently is not only centered in the spindle opening, but the driving means is so distributed that the shank can not be twisted.

My invention may be further briefly summarized as consisting in certain novel details of construction and combinations and arrangements of parts which will be described in the specification and set forth in the claims.

For a better understanding of my invention, reference should be had to the accompanying drawings wherein—

Figure 1 is a view showing a portion of the spindle in vertical section and showing a portion of the tool and combined driving and centering device in elevation, a portion of the latter being broken away; Fig. 2 is a similar view with the parts turned ninety degrees; Fig. 3 is a transverse sectional view substantially along the line 3—3 of Fig. 2, looking in the direction indicated by the arrow; Fig. 4 is a transverse sectional view substantially along the line 4—4 of Fig. 1, looking in the direction indicated by the arrow; and Fig. 5 is a perspective view of the centering and driving device.

Referring now to the figures of the drawing, 10 represents the drill spindle which is provided with a conical opening or socket 11, and at the inner end of the conical opening with a narrow slot 12 which extends laterally or transversely through the spindle so as to receive the tang of the tool and form a drift slot to permit the tool to be removed from the spindle.

13 represents the tool which is driven by the spindle, which tool may be of any suitable form, such as a twist drill. The tool is provided with a shank 14 having opposite flat tapered sides $14^a$, and having edges $14^b$ which are curved or rounded concentrically with respect to the axis of the spindle and are tapered in accordance with the taper of the spindle opening 11 so as to fit or engage the wall of the same. The inner end of the shank, as appears particularly from Fig. 2, extends into the slot 12, so as to provide the driving connection between the spindle and the inner end of the shank, as with the ordinary commercial twist drills. It is seen therefore that although the edges of the shank are so formed as to fit tightly the wall of the conical spindle opening, the flat sides are nowhere in engagement with said wall.

To accomplish the objects before mentioned, I employ at the end of the spindle a centering and driving device comprising a collar 15 having an opening $15^a$ therethrough which corresponds to the cross section of the outer portion of the shank and is shaped to substantially fit the latter when the shank is the full distance within the spindle, and having a pair of inwardly extending lugs 16 which occupy or fill the otherwise open spaces between the flat tapered sides of the shank and the wall of the outer portion of the conical spindle opening. These lugs are therefore provided with inner flat faces $16^a$ which are tapered inwardly in accordance with the taper of the sides $14^a$ of the shank and which are preferably flush with the sides of the opening $15^a$ in the collar 15 so that said faces engage the sides $14^a$ of the shank with a close fit. The lugs are also provided with outer curved or rounded surfaces $16^b$ which form portions of the same conical surface and are tapered to fit the wall of the conical spindle opening.

In order that the device at the end of the spindle may, in addition to centering the tool, form with the spindle an auxiliary driving means, the spindle and collar are provided with interlocking driving parts. Preferably, these interlocking parts are formed by providing a mortise slot $10^a$ on the end of the spindle and by cutting away portions of the inner part of the collar on opposite sides so as to form projections $15^b$ which engage in the mortise slot $10^a$. In order that the centering and driving device may be readily removed from the spindle, the projections $15^b$ are provided with slightly tapered slots $15^c$ into which the end of a suitable removing tool may be inserted.

I do not desire to be confined to the exact details shown, but aim in my claims to cover all modifications which do not involve a departure from the spirit and scope of my invention.

Having thus described my invention, what I claim is:

1. In combination a spindle having a conical opening therein, a tool having a shank which extends into said opening and is provided with opposite substantially flat sides and with edges rounded and tapered to fit the conical wall of the spindle opening, and a device at the end of the spindle comprising a collar through which the shank extends, and inwardly projecting lugs having inner faces which engage the opposite flat sides of the shank, and outer rounded surfaces which engage the conical wall of the spindle opening.

2. In combination, a spindle having a conical opening therein, a tool having a shank which extends into the opening and is provided with opposite flat tapered sides and edges rounded and tapered to fit the conical wall of the spindle opening, and a device at the outer end of the spindle comprising a collar through which the shank extends, and inwardly projecting lugs having inner flat faces which engage the flat tapered sides of the shank, and outer surfaces which engage and are rounded and tapered to fit the wall of the spindle opening.

3. In combination, a spindle having a conical opening therein, a tool having a shank which projects into said opening and is provided with opposite flat tapered sides and with edges rounded and tapered to fit the conical walls of the spindle opening, and centering and driving means for the outer portion of the shank comprising a collar at the end of the spindle provided with an opening shaped to substantially fit the shank and with inwardly projecting lugs which engage the conical wall of the spindle opening and engage the opposite flat tapered sides of the shank, said collar and spindle having interlocking portions.

4. In combination, a spindle having a conical opening therein, a tool having a shank which has a driving connection with the spindle at the inner end of the conical opening, and is provided with tapered flat opposite sides and with edges rounded and tapered to fit the conical wall of the spindle opening, and means for centering the tool in the spindle opening and for forming an auxiliary driving connection between the spindle and tool comprising a collar having an opening through which the shank extends, and inwardly projecting lugs having inner tapered faces which engage the opposite flat tapered faces of the shank, and outer surfaces which fit the conical wall of the spindle opening, the spindle and collar having interlocking portions formed by a slot in one of the members, and a projection on the other member engaging in the slot.

5. As an article of manufacture, means for centering a tool in a spindle opening comprising a collar provided with a substantially rectangular opening extending therethrough and provided on one side with a pair of lugs which are spaced apart and are provided with inner substantially flat faces, and with outer surfaces rounded concentrically with respect to each other.

6. As an article of manufacture, means for centering a tool in a spindle opening and for forming a driving connection between the tool and spindle, comprising a collar having a substantially rectangular opening extending therethrough and provided on one side with a projection adapted to interlock with the end of the spindle and with a pair of lugs adapted to extend into the spindle opening, said lugs being provided with oppositely disposed inner flat faces slightly tapered and flush with the sides of the opening of the collar, and with outer side surfaces rounded concentrically with respect to each other and forming portions of a conical surface.

In testimony whereof, I hereunto affix my signature in the presence of two witnesses.

SAMUEL H. COX.

Witnesses:
  H. R. SULLIVAN,
  A. J. HUDSON.